United States Patent [19]

Simos

[11] 4,120,628
[45] Oct. 17, 1978

[54] APPARATUS FOR MANUFACTURING PLASTIC TUBES FROM PLASTICS OF DISSIMILAR PROPERTIES

[75] Inventor: Rigas Christos Simos, Athens, Greece

[73] Assignee: General Enterprises Corp., Ltd., Greece

[21] Appl. No.: 744,879

[22] Filed: Nov. 24, 1976

Related U.S. Application Data

[63] Continuation of Ser. No. 493,629, Jul. 31, 1974, abandoned, which is a continuation of Ser. No. 197,227, Nov. 10, 1971, abandoned.

[30] Foreign Application Priority Data

May 5, 1971 [GR] Greece .................................. 45310

[51] Int. Cl.² ............................................. B29D 23/04
[52] U.S. Cl. ................... 425/131.1; 264/241; 425/192 R; 425/376 B; 425/381; 425/462; 425/466
[58] Field of Search .................... 425/133.1, 113, 114, 425/376 B, 132, 382 N, 190, 192 R, 131.1, 462, 466; 264/173, 174, 241, 245

[56] References Cited

U.S. PATENT DOCUMENTS

| 3,520,966 | 7/1970 | Soffiantini | 425/133.1 X |
| 3,528,130 | 9/1970 | Lefevre et al. | 425/133.1 |

FOREIGN PATENT DOCUMENTS 1,028,325  4/1958  Fed. Rep. of Germany ........ 425/133.1

Primary Examiner—Francis S. Husar
Assistant Examiner—Mark Rosenbaum
Attorney, Agent, or Firm—Craig & Antonelli

[57] ABSTRACT

An apparatus for extruding plastic tubes, which may be substantially rigid, semi-flexible, or flexible, as desired. A spiral or helical tape or filament is extruded, simultaneously with a plastic tube, whereby the resulting final product comprises a reinforcing helical skeleton, and an integral tube covering. The spiral or helical tape or filament is rotated as it is extruded, whereby the filament may be close together or relatively spacially separated, during extrusion, as for example, in the manufacture of a flexible hose. The diameter of the finished product can be readily varied, by simply adjusting the size of the extrusion collar. The reinforced tube manufactured according to the process and with the apparatus is strong, smooth, and relatively inexpensive.

8 Claims, 4 Drawing Figures

APPARATUS FOR MANUFACTURING PLASTIC TUBES FROM PLASTICS OF DISSIMILAR PROPERTIES

This is a continuation of application Ser. No. 493,629, filed July 31, 1974, now abandoned, which is a continuation of application Ser. No. 197,227, filed Nov. 10, 1971, now abandoned.

This invention relates to an apparatus for the manufacture of tubes from plastics material.

It is an object of the present invention to provide an apparatus for manufacturing tubes from plastics material which are simple and technically inexpensive, whereby tubes having differing technological properties and differing fields of use can be produced in a single operation.

It is a further object of the invention to provide a simple apparatus for the manufacture of a tube of a novel type with high mechanical properties and characteristics which can, in general, perform the function of any conventional tube, including such a tube used for specialized purposes.

According to the present invention, therefore, there is provided an apparatus for manufacturing tubes of synthetic material, characterized in that a semi-rigid stronger plastic synthetic material spirally or helically wound tape or filament in double parallel plies forming the reinforced skeleton of a tube, and a tube of soft synthetic material, are produced simultaneously.

The tape or filament is produced according to the invention by a straight, continuous, and rotating process whereby tapes or filaments having a wide range of cross-sectional shapes are formed. The tape or filament may be automatically, spirally or helically discharged into a chamber where it joins a soft synthetic material, and is automatically vulcanized jointly therewith and formed into a tube together therewith. The thermal temperature for vulcanization is adjustable according to the properties required for each type of tube.

Preferably the tape or filament forming the skeleton of the tube has a substantially S-shaped cross-section and the tube has a substantially round cross-section, while the soft synthetic material may, for example, comprise polyvinyl chloride or polyethylene or other soft synthetic material.

The tape or filament can be wound spirally or helically so that its corresponding mutually facing edges are brought into firm engagement with each other and/or its ends are applied inside each other. In particular, this has the advantage that a relatively rigid tube can be produced, which is substantially incompressible.

Alternatively, when corresponding mutually facing edges of the tape or filament and/or the ends thereof touch each other simply, then a less rigid tube of the type of semi-flexible tubing is produced.

Alternatively, a distance may be advantageously provided between the mutually facing edges and/or ends of the said tape or filament, so that a fully flexible tube is produced.

The spirally or helically wound tape or filament is firmly bonded to the casing of the tube, preferably by heat-sealing. This has the particular advantage that the complete amalgamation of the spirally- or helically-shaped tape or filament with the soft synthetic material, which comprises flexible PVC, or other synthetic material is achieved by a continuous working action, so as to produce a compact and inseparable tube wall.

According to the preferred embodiment of the invention, the tubes are produced, as mentioned above, from semi-rigid filaments of synthetic material having an S-shaped or round cross-section.

In a modification of the last mentioned preferred embodiment, the filaments are formed in double or multiple plies thereby constituting the reinforced skeleton of the tube to be produced. The spirally shaped skeleton is then embedded into a wall of the tube consisting of flexible polyvinyl chloride or other synthetic material, and by their complete amalgamation, a compound and inseparable integral hose may be obtained. According to the above-given preferred embodiment, it is possible to produce different types of tubes by varying the speed of rotation of the shaft and varying the distances between the corresponding wall edges. Thus the complete amalgamation of the spirally shaped skeleton with the soft PVC is achieved in a continuous operation.

According to a further feature of the present invention, there is provided an apparatus for use in carrying out the the invention characterized in that it is provided with a Head's outer shell, the front and rear faces of which each has a screwed cap secured thereto, in which shell there is rotatably mounted on bearings a shaft which has an inlet for plastics material forming the skeleton of the tube, and which inlet extends into an axial opening and via channels into at least two outlet nozzles spaced equally about the axis of said shaft; in the side of the Head's outer shell there is provided a further inlet for the soft synthetic material forming the walls of the tube, which inlet communicates with the outlet openings via ducts, and a collecting chamber communicating with said ducts is provided in the shell, within which chamber a spirally wound or helical tape or filament is embedded in the soft synthetic material forming the tube wall, whereby the finished tube can be forced out by the pressure of the extruders from an outlet.

Means are provided for adjusting the diameter of the collecting chamber, said means suitably comprising an interchangeable regulating collar and a likewise interchangeable support arrangement therefor. This has the particular advantage that the diameters of the tubes to be produced differ as desired. Also, the rotational speed of the shaft adapted to be driven by a pinion and chain drive means connected with a motor is preferably adjustable.

The above described apparatus of the invention may be used to achieve complete amalgamation of the spirally shaped skeleton with the soft PVC in a continuous operation, as described above.

The essential advantages of the invention can be summarized as follows. By the apparatus of the invention the spirally shaped skeleton and the walls of the tube are simultaneously and automatically transformed into an integral hose which can have different diameters and different colours. The tubes produced in accordance with the invention are very light in weight and uncrushable when used conventionally. They are generally resistant to high pressures demanded in conventional use and to suction action, wear, abrasion and the like. Furthermore, they are generally resistant to breakdown at temperatures ranging from −15° to +65° C. Furthermore, they are generally resistant to attack by many chemical substances such as acids, alkalis, e.g. alkaline solutions, or oils and the like. The tubes manufactured by the apparatus of the invention may be made so as to be suitable for use for general purposes, for example for irrigation, water supply, drainage and industrial use, e.g. industrial plants conveyance or vacuuming of air, oil, petroleum and other chemicals.

The invention further includes features as described hereinafter, which are associated essentially with the foregoing.

Further advantages will be apparent from the following description of an exemplary embodiment of the apparatus of the invention with reference to the accompanying drawings, in which.

Figure 4:
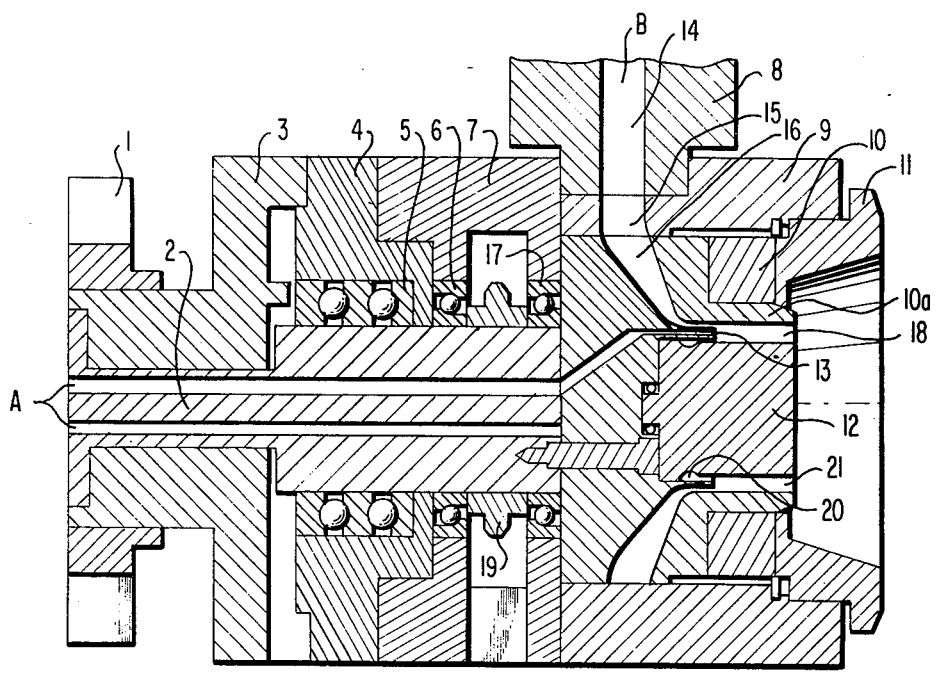
FIG. 4 shows a sectional view through the apparatus of the invention.

As shown in FIG. 4, the apparatus comprises a Head's outer shells 4, 7 and 9 to which a front screwed cap 11 and a rear cap 3 are secured. Furthermore, there is provided a shaft 2 and an inlet A, from which the semi-rigid plastics material is fed for production of S-shaped or round filament or tape forming the skeleton of the hose, are forced out, through special extrusion outlet nozzles 13, into collecting chamber 18.

A second inlet B for the soft plastic material is provided in the Head's outer shell 9 from which inlet the soft plastics material is fed through ducts 14, 15 and 16 to outlet openings to produce the walls of the hose, into which the S-shaped or round filament or tape is embedded. Thus a compact and stable solid integral body is obtained.

Figure 3:
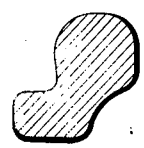
FIG. 3 shows a cross-section through the tape or filament forming the skeleton.

The semi-rigid plastics material is fed under pressure through the inlet A into a rotatable shaft 2 rotating on bearings 5, 6 and 17, and thence the material leaves through two or more extrusion outlet nozzles 13 which are spaced equally about the shaft 2. By means of the special extrusion nozzles 13, the helical filament or tape is produced in the form of an S, as shown in FIG. 3, or round, and is forced out by the extruders into the collecting chamber 18 provided in the shell and communicating with ducts 14, 15 and 16 from which the soft plastics material emerges. Both inlets A and B are connected respectively to nozzles (not shown) of two extruders which simultaneously feed the relevant plastics material into the said Head of the apparatus.

Figure 2:
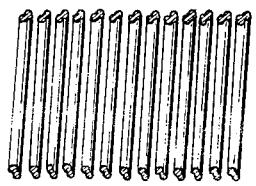
FIG. 2 shows a sectional view, in which the tape or filament sections of the skeleton are spaced apart from each other.

By means of the force from the continuous pressure of the extruder, and continuous feeding of the plastics material into the Head of the apparatus, the filament or tape having a cross-section either in the shape of an S or round is produced by rotation of the shaft 2 and is extruded so as, with the continuous rotation of the shaft 2, to emerge in a spiral or helical form. The shaft 2 can be rotated by an electric motor (not shown) which is connected by a chain to the tooth pinion 19, the rotational speed of the motor being adjustable to any desired value. According to the adjustment of the speed, any desired pitch of the helical skeleton may be achieved, e.g., as shown in FIG. 2.

Figure 1:
FIG. 1 shows the tape or filament which is spirally wound in the form of a tube and which has its corresponding edges spirally in engagement.

At the same time, the soft synthetic material is extruded to the collecting chamber, or extrusion passage 18 through ducts 14, 15 and 16 and from collecting channel 20 which are in communication. The helical skeleton is thus embedded in the soft plastics material forming the tube wall in the collecting chamber 18. The diameter of the collecting chamber 18 is adjustable with the aid of a special interchangeable regulating collar 10A and its support arrangement 10, so as to obtain the desired thickness of the tube walls. The internal diameter of the tube is achieved by providing a cylinder 12 which is interchangeable for the production of pipes with any desired internal diameter so as with the same apparatus and by adjusting only the collar 10A, supporter 10 and cylinder 12, pipes of different internal diameter and different wall thickness are produced as desired. Then the wall of the tube is automatically amalgamated, and welded with and sealed to the helical filament or tape by means not shown. Thus, by means of the continuous pressure from both extruder nozzles, a hose is extruded from the outlet 21 in a compact and inseparable wall in which the helical filament or tape is embedded in at least two parallel plies as shown in FIG. 1.

Variations on the preferred embodiment are possible. Thus, for example, extrusion nozzles 13 may be connected to separate sources of material and fed e.g., by tubes concentric with inlet A, to form filaments of differing shape, colour, or properties. Such filaments may be formed, in the process of the invention, having hollow sections so as to have an internal duct.

Moreover, according to this invention, there can be achieved, simultaneously with automatic production of the pipe, the formation and stabilization of the cylindrical form of the emerged tube from outlet 21 by means of compressed air fed into the produced pipe.

According to the process, air is fed by special adjustable apparatus thus achieving the supply of the needed quantity and pressure of air according to the size and diameter of the tube, to the main production apparatus (Head) from the rear or front sides, where two special inlets are provided.

By this system and the continuous force of compressed air, the formation and stabilization of the cylindrical shape of the tube is achieved thus eliminating the mechanical means known till now.

By this invention, the tubes, which are in changeable thermoplastic state, with the action of the continuous pressure of air, maintain their form for an interval of time, and by the action of the air on the internal surface and of the water on the external surface, the final stabilization of the tube in the desired diameter and the absolute smoothness of the internal surface is achieved.

Because most synthetic plastics do not solidify immediately nor slip easily on metallic or other surfaces, this invention permits the tube extruded from the production apparatus through outlet 21, to avoid contact with metallic or other objects for its support, but is instead supported by the compressed air in a horizontal position until it passes through cool water, thus maintaining its exact form shaped by the production apparatus as it passes through outlet 21.

At the same time, the stabilization of the internal surface of the tube is assured by the supply of cool air.

I claim:

1. An extrusion apparatus for manufacturing plastic tubes from plastics of dissimilar properties comprising an outer shell, a shaft centrally disposed with respect to said outer shell and rotatably mounted for rotation with respect to said outer shell, means arranged at an outlet end of the extrusion apparatus for forming an annular extrusion passage, at least one first supply duct means for one plastic material extending through the rotatable shaft from one end thereof to an at least first outlet means into the extrusion passage, a second supply duct means for another plastic material extending through said outer shell to a second outlet means into said extrusion passage, said at least first supply duct means and said at least first outlet means being for production of a spiral or helical tape or filament, and said second supply duct means and said second outlet means being for production of the tube wall, said spiral or helical tape or filament becoming embedded in the material forming the tube wall in said extrusion passage.

2. An extrusion apparatus according to claim 1, wherein said at least first supply duct means extends from one end of the rotatable shaft in the axial direction of the shaft.

3. An extrusion apparatus according to claim 2, wherein said second supply duct means extends from a side portion of said outer shell to said second outlet means.

4. An apparatus according to claim 1, wherein said means forming the annular extrusion passage includes means for adjusting the size of the annular passage.

5. An apparatus according to claim 4, wherein said adjusting means includes an interchangeable regulating collar and an interchangeable support arrangement therefor.

6. An apparatus according to claim 1, wherein said rotatable shaft is arranged to be driven by a pinion and chain drive means connected with a motor.

7. An apparatus according to claim 6, wherein the rotational speed of said motor is adjustable to any desired value, whereby according to the adjustment of the speed, any desired pitch of the helical tape or filament may be achieved.

8. An extrusion apparatus according to claim 1, wherein said at least first outlet means comprises a nozzle for forming a spiral or helical tape or filament of any desired cross-sectional configuration.

* * * * *